US 8,819,128 B2

(12) United States Patent
Murray, II

(10) Patent No.: US 8,819,128 B2
(45) Date of Patent: Aug. 26, 2014

(54) APPARATUS, METHOD, AND COMPUTER PROGRAM FOR PROVIDING INSTANT MESSAGES RELATED TO A CONFERENCE CALL

(75) Inventor: F. Randall Murray, II, McKinney, TX (US)

(73) Assignee: Apple Inc., Cupertino, CA (US)

( * ) Notice: Subject to any disclaimer, the term of this patent is extended or adjusted under 35 U.S.C. 154(b) by 2106 days.

(21) Appl. No.: 10/675,121

(22) Filed: Sep. 30, 2003

(65) Prior Publication Data
US 2005/0069116 A1    Mar. 31, 2005

(51) Int. Cl.
G06F 15/16    (2006.01)
H04L 12/58    (2006.01)
H04M 3/56    (2006.01)
H04L 12/18    (2006.01)

(52) U.S. Cl.
CPC ............. *H04L 12/581* (2013.01); *H04M 3/567* (2013.01); *H04M 2203/4536* (2013.01); *H04M 2203/5027* (2013.01); *H04L 12/1818* (2013.01); *H04M 2203/5018* (2013.01); *H04M 2203/5009* (2013.01); *H04L 51/04* (2013.01)
USPC ............................ 709/204; 709/203; 709/205

(58) Field of Classification Search
USPC ............................ 709/204–207; 379/202.01
See application file for complete search history.

(56) References Cited

U.S. PATENT DOCUMENTS

| 5,619,555 | A | 4/1997 | Fenton et al. |
| 5,710,591 | A | 1/1998 | Bruno et al. |
| 5,812,653 | A | 9/1998 | Jodoin et al. |
| 5,889,945 | A | 3/1999 | Porter et al. |
| 6,073,166 | A | 6/2000 | Forsen |
| 6,125,115 | A | 9/2000 | Smits |
| 6,185,565 | B1 | 2/2001 | Meubus et al. |
| 6,501,834 | B1 | 12/2002 | Milewski et al. |
| 6,594,693 | B1 | 7/2003 | Borwankar |
| 6,618,746 | B2 * | 9/2003 | Desai et al. ................... 709/204 |
| 6,628,767 | B1 * | 9/2003 | Wellner et al. ........... 379/202.01 |
| 6,671,717 | B1 * | 12/2003 | Shaffer et al. ................. 709/204 |
| 6,747,970 | B1 * | 6/2004 | Lamb et al. ................... 370/352 |

(Continued)

FOREIGN PATENT DOCUMENTS

WO    WO 03/021900 A1    3/2003
WO    WO 03/051027 A1    6/2003
WO    WO 03/061227 A2    7/2003

OTHER PUBLICATIONS

Kumar, Korpi, Sengodon: "IP Telephony with H.323, Architectures for Unified Networks and Integrated Services", Apr. 1, 2001, John Wiley & Sons, Inc., US, XP002302183, pp. 134-142 and pp. 290-298.

(Continued)

*Primary Examiner* — Umar Cheema
(74) *Attorney, Agent, or Firm* — Meyertons, Hood, Kivlin, Kowert & Goetzel, P.C.

(57) ABSTRACT

A call conferencing apparatus, method, and computer program detect one or more events that are related to a conference call. The apparatus, method, and computer program then send one or more instant messages to one or more participants associated with the conference call. The one or more events could include, for example, a participant joining the conference call, a participant exiting the conference call, a participant failing to log into the conference call correctly, a participant transferring to another communication device during the conference call, a beginning of the conference call, and an end of the conference call.

32 Claims, 2 Drawing Sheets

(56) References Cited

U.S. PATENT DOCUMENTS

| | | | |
|---|---|---|---|
| 6,763,226 | B1 | 7/2004 | McZeal, Jr. |
| 6,854,114 | B1 | 2/2005 | Sexton et al. |
| 6,866,578 | B2 | 3/2005 | Orendorff |
| 6,920,475 | B1 | 7/2005 | Klots et al. |
| 6,931,113 | B2 * | 8/2005 | Ortel ............... 379/202.01 |
| 6,976,055 | B1 * | 12/2005 | Shaffer et al. ............. 709/204 |
| 6,987,736 | B1 | 1/2006 | Horton |
| 7,003,086 | B1 | 2/2006 | Shaffer et al. |
| 7,042,879 | B2 | 5/2006 | Eschbach et al. |
| 7,047,030 | B2 * | 5/2006 | Forsyth ............... 455/518 |
| 7,058,036 | B1 | 6/2006 | Yu et al. |
| 7,113,987 | B2 * | 9/2006 | Nabkel et al. ............. 709/224 |
| 7,136,462 | B2 * | 11/2006 | Pelaez et al. ............. 379/88.14 |
| 7,154,864 | B2 * | 12/2006 | Costa-Requena et al. .... 370/261 |
| 7,154,999 | B2 * | 12/2006 | Florkey et al. ......... 379/142.01 |
| 7,177,302 | B2 | 2/2007 | Stademann |
| 2002/0069069 | A1 | 6/2002 | Kanevsky et al. |
| 2002/0071539 | A1 | 6/2002 | Diament et al. |
| 2002/0071540 | A1 | 6/2002 | Dworkin |
| 2002/0078150 | A1 | 6/2002 | Thompson et al. |
| 2002/0118809 | A1 | 8/2002 | Eisenberg |
| 2002/0161578 | A1 | 10/2002 | Saindon et al. |
| 2002/0188777 | A1 | 12/2002 | Kraft et al. |
| 2003/0014488 | A1 * | 1/2003 | Dalal et al. ............... 709/204 |
| 2003/0039340 | A1 | 2/2003 | Deshpande et al. |
| 2003/0145054 | A1 * | 7/2003 | Dyke ............... 709/205 |
| 2003/0187658 | A1 | 10/2003 | Selin et al. |
| 2003/0233416 | A1 | 12/2003 | Beyda |
| 2003/0233417 | A1 | 12/2003 | Beyda et al. |
| 2004/0001574 | A1 * | 1/2004 | Seligmann ............... 379/88.01 |
| 2004/0003041 | A1 | 1/2004 | Moore et al. |
| 2004/0037406 | A1 * | 2/2004 | Gourraud ............... 379/202.01 |
| 2004/0086100 | A1 | 5/2004 | Moore et al. |
| 2004/0125932 | A1 * | 7/2004 | Orbach et al. ......... 379/202.01 |
| 2004/0190702 | A1 * | 9/2004 | Mayer et al. ......... 379/202.01 |
| 2004/0199649 | A1 * | 10/2004 | Tarnanen et al. ............. 709/230 |
| 2004/0203677 | A1 | 10/2004 | Brown et al. |
| 2005/0021344 | A1 | 1/2005 | Davis et al. |
| 2005/0069116 | A1 | 3/2005 | Murray, II |
| 2005/0074101 | A1 | 4/2005 | Moore et al. |
| 2005/0198096 | A1 | 9/2005 | Shaffer et al. |
| 2005/0206721 | A1 | 9/2005 | Bushmitch et al. |
| 2005/0212908 | A1 | 9/2005 | Rodman et al. |
| 2005/0213724 | A1 | 9/2005 | O'Brien et al. |
| 2007/0230668 | A1 | 10/2007 | Brown et al. |

OTHER PUBLICATIONS

Office Action dated Sep. 17, 2008 issued in connection with U.S. Appl. No. 10/610,511, filed Jun. 30, 2003.

Office Action as issued by the United States Patent and Trademark Office on Apr. 27, 2009 in connection with U.S. Appl. No. 10/610,511, filed Jun. 30, 2003.

Office Action dated Jul. 25, 2007 in connection with U.S. Appl. No. 10/814,383, filed Mar. 31, 2004.

Office Action dated Dec. 1, 2006 in connection with U.S. Appl. No. 10/814,383, filed Mar. 31, 2004.

Office Action dated May 5, 2006 in connection with U.S. Appl. No. 10/814,383, filed Mar. 31, 2004.

Office Action dated Sep. 21, 2005 in connection with U.S. Appl. No. 10/814,383, filed Mar. 31, 2004.

Office Action dated Dec. 6, 2007 in connection with U.S. Appl. No. 10/610,517, filed Jun. 30, 2003.

Office Action dated Jun. 19, 2007 in connection with U.S. Appl. No. 10/610,517, filed Jun. 30, 2003.

Office Action dated Apr. 6, 2007 in connection with U.S. Appl. No. 10/610,511, filed Jun. 30, 2003.

Office Action dated Oct. 12, 2007 in connection with U.S. Appl. No. 10/610,511, filed Jun. 30, 2003.

Office Action dated Feb. 22, 2008 in connection with U.S. Appl. No. 10/610,511, filed Jun. 30, 2003.

Office Action dated Dec. 12, 2007 in connection with U.S. Appl. No. 10/814,080, filed Mar. 31, 2004.

Office Action dated Dec. 9, 2009 in connection with U.S. Appl. No. 10/610,511.

* cited by examiner

APPARATUS, METHOD, AND COMPUTER PROGRAM FOR PROVIDING INSTANT MESSAGES RELATED TO A CONFERENCE CALL

CROSS REFERENCE TO RELATED APPLICATIONS

This application is related to U.S. patent application Ser. No. 10/610,511 entitled "DISTRIBUTED CALL SERVER SUPPORTING COMMUNICATION SESSIONS IN A COMMUNICATION SYSTEM AND METHOD," filed on Jun. 30, 2003, and which is incorporated herein by reference.

TECHNICAL FIELD

This disclosure relates generally to conferencing systems and more specifically to an apparatus, method, and computer program for providing instant messages related to a conference call.

BACKGROUND

Audio and video conferencing systems are becoming more popular in the United States and around the world. In a conventional conferencing system, one participant communicates audio signals to other participants (often through a multipoint conferencing server or other unit) and receives audio signals from the other participants (indirectly through the server). The participants may also exchange video images allowing the participants to see one another.

SUMMARY

This disclosure provides an apparatus, method, and computer program for providing instant messages related to a conference call.

In one aspect, a call conferencing apparatus, method, and computer program detect one or more events that are related to a conference call. The apparatus, method, and computer program then send one or more instant messages to one or more participants associated with the conference call.

In a particular aspect, the one or more events could include a participant joining the conference call, a participant exiting the conference call, a participant failing to log into the conference call correctly, a participant transferring to another communication device during the conference call, a beginning of the conference call, and an end of the conference call.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
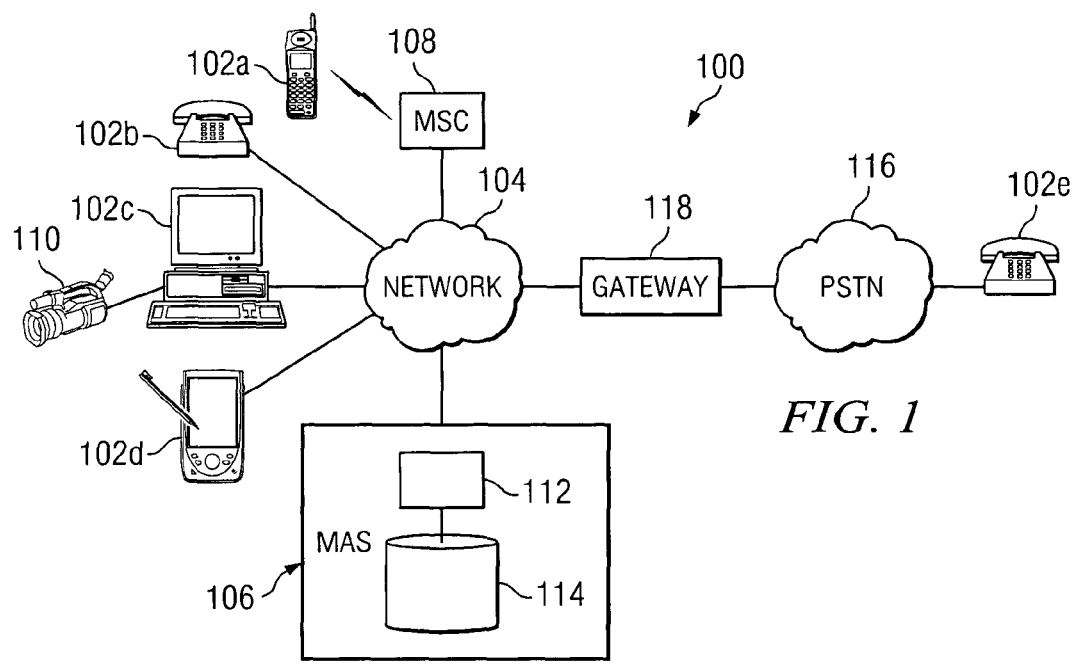
FIG. 1 illustrates an example conferencing system according to one embodiment of this disclosure.

FIG. 1 illustrates an example communication system 100 according to one embodiment of this disclosure. The system 100 shown in FIG. 1 is for illustration only. Other embodiments of the system 100 may be used without departing from the scope of this disclosure.

A problem with conventional conferencing systems is that the participants often cannot easily determine when different events occur. For example, conventional conferencing systems simply produce an audible "beep" or other noise that alerts the other participants in a conference call that a new participant has joined. The other participants are then often forced to ask who joined the conference call. Similarly, conventional conferencing systems simply produce an audible beep when a participant leaves a conference call. To identify the participant who left, each remaining participant typically needs to say that he or she did not leave, and by process of elimination the participant who left is identified. This is typically inconvenient for the conference call participants.

In the illustrated example, the system 100 includes one or more communication devices 102a-102d, a network 104, and a media application server ("MAS") 106.

The communication devices 102a-102d represent devices used by users or subscribers during communication sessions. Communication sessions represent data conversions or conversations between devices or applications over a network. For example, each communication device 102a-102d represents an input/output device that could include a microphone and a speaker to capture and play audio information. A communication device 102a-102d could also include a camera and a display to capture and present video information. A communication device 102a-102d could further represent a portable computing device for sending and receiving text or other messages.

During a communication session, one or more of the devices 102 communicate with the MAS 106 over the network 104. As an example, a communication device 102 may transmit audio information to the MAS 106 and receive audio information from the MAS 106. Each communication device 102 may be constructed or configured from any suitable hardware, software, firmware, or combination thereof for transmitting or receiving audio, video, or other information.

The system 100 shown in FIG. 1 illustrates various embodiments of the communication devices 102. For example, the communication device 102a represents a wireless mobile station that communicates with the network 104 through a mobile switching center ("MSC") 108. The communication device 102b represents a wired Internet Protocol ("IP") telephone that communicates directly with the network 104. An example of a suitable device is an i2004 Internet Telephone, commercially available from Nortel Networks of Brampton, Ontario, Canada. The communication device 102c represents a personal computer, such as a desktop computer or a laptop computer. The communication device 102d represents a wireless device, such as a Blackberry or personal digital assistant. One or more of these devices 102a-102d may include video functionality, such as when the communication device 102a includes a video camera or when the communication device 102c is coupled to a web camera 110.

While this represents several embodiments of the communication devices 102, other or additional communication devices 102 may be utilized in the system 100 of FIG. 1. By way of illustration in FIG. 1, each of the communication devices 102a-102d is different. It will be understood, however, that the communication devices 102 in the system 100 may include or represent the same or similar type of device or other combination of communication devices.

The network 104 is coupled to the communication devices 102, the MAS 106, and the mobile switching center 108. In this document, the term "couple" refers to any direct or indirect communication between two or more components, whether or not those components are in physical contact with each other. The network 104 facilitates communication between components of the system 100. For example, the network 104 may communicate Internet Packets ("IP"), frame relay frames, Asynchronous Transfer Mode ("ATM") cells, Ethernet, X.25, frame relay, or other suitable information protocols between network addresses or devices. The network 104 may include one or more local area networks ("LANs"), metropolitan area networks ("MANs"), wide area networks ("WANs"), all or portions of a global network such as the Internet, or any other communication system or systems at one or more locations.

The media application server ("MAS") 106 is coupled to the network 104. The MAS 106 supports communication sessions between communication devices 102 in the system 100. For example, the MAS 106 may receive from one or multiple communication devices 102 requests to establish or join a conference call. The MAS 106 may also transmit/receive audio or video information to/from each communication device 102 involved in the conference call.

Figure 2:
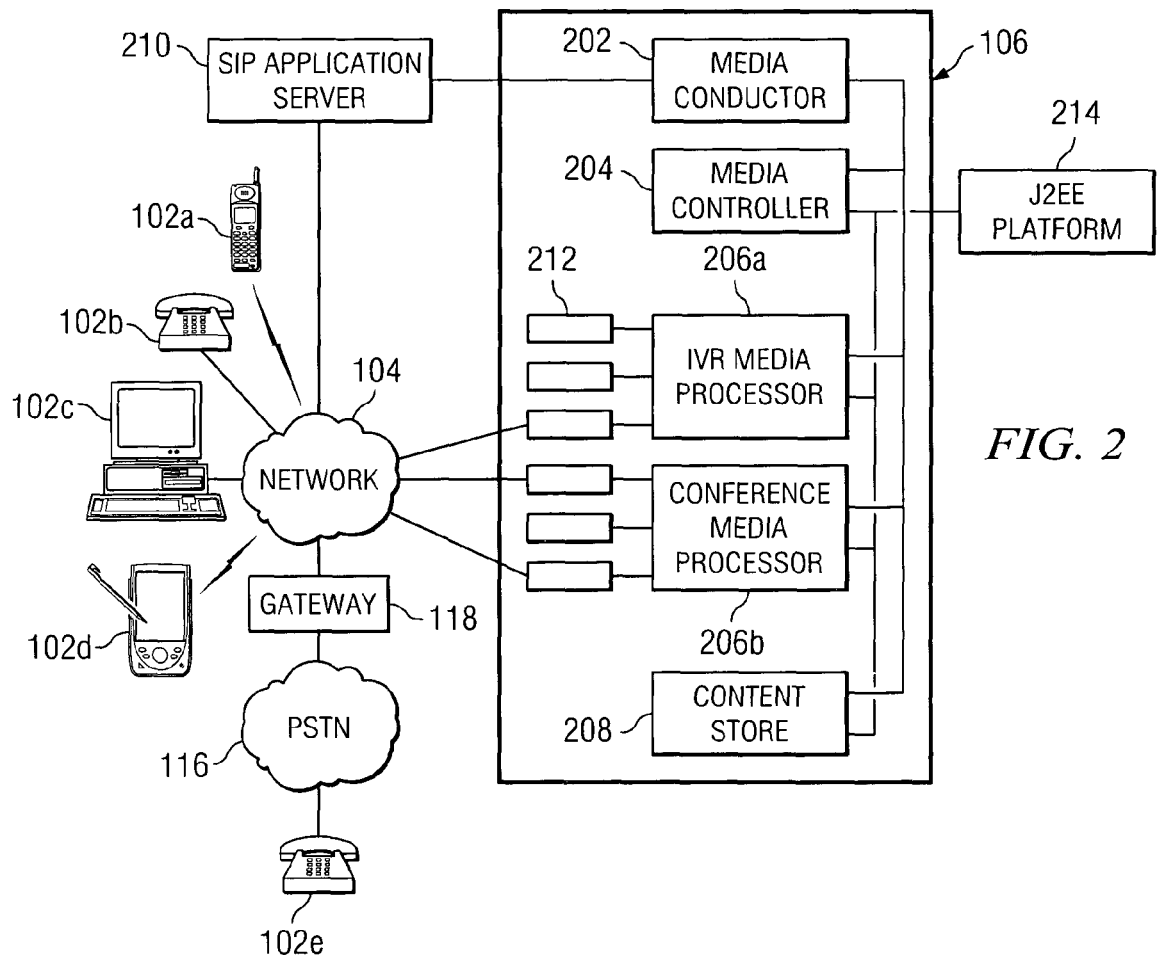
FIG. 2 illustrates an example media application server according to one embodiment of this disclosure.

The MAS 106 may be constructed or configured using any hardware, software, firmware, or combination thereof for supporting communication sessions in the system 100. As an example, the MAS 106 could include one or more processors 112 that execute instructions and one or more memories 114 that store instructions and data used by the processors 112. The processor(s) 112 is generally understood to be a device that drives a general-purpose computer. It is noted, however, that other processor devices such as microcontrollers, Field Programmable Gate Arrays (FPGAs), or Application Specific Integrated Circuits (ASICs) can be used as well and achieve the benefits and advantages described herein. An example MAS 106 is shown in FIG. 2, which is described below and in co-pending U.S. patent application Ser. No. 10/610,511 entitled "DISTRIBUTED CALL SERVER SUPPORTING COMMUNICATION SESSIONS IN A COMMUNICATION SYSTEM AND METHOD," filed on Jun. 30, 2003, and which is incorporated by reference herein.

Communication session(s) established and managed by the MAS 106 can include additional communication devices other than the communication devices 102a-102d. For example, a communication device 102e is shown coupled to the network 104 through a public telephone network, such as a public switched telephone network ("PSTN") 116. The communication device 102e may include a conventional analog or digital telephone or some other type of communication device. In embodiments where the PSTN 116 and the network 104 use different or incompatible protocols to communicate, a gateway 118 may be used that is coupled to the network 104 and the PSTN 116 to facilitate communication between the networks. The gateway 118 functions to translate between the different protocols used by the network 104 and the PSTN 116. Although one PSTN 116 is shown in FIG. 1 coupled to the network 104, other or additional types of public or private networks may be coupled to the network 104.

The communication devices 102 and the MAS 106 could support suitable standards or protocols used to set up, maintain, and terminate communication sessions between end users. As examples, the communication devices 102 and the MAS 106 could communicate audio, video, or other information using the Realtime Transfer Protocol ("RTP") over User Datagram Protocol ("UDP"), the International Telecommunication Union—Telecommunications ("ITU-T") H.263 standard (video CODEC), the G.711 and G.729 audio CODEC standards, and other or additional standards or protocols. Other CODECs, such as Moving Picture Experts Group-4 ("MPEG-4"), Digital Video Express ("DIVX"), and Windows Media Video ("WMV"), can be supported by the MAS 106. In addition, signaling messages sent between the communication devices 102 and the MAS 106 may include or conform with the Session Initiation Protocol ("SIP"), which is an application layer protocol for the establishment, modification, and termination of conferencing and telephony sessions over IP-based networks. As will be appreciated, other or additional protocols and configurations may be used.

In one aspect of operation, the MAS 106 includes one or more processes, such as software applications providing an activity, a function, or a systematic sequence of operations that produces a specified result, for handling conference calls. In this document, the phrase "conference call" refers to a communication session involving more than two participants.

During a conference call, the MAS 106 generates and communicates one or more instant messages to various participants who use or have access to one or more communication devices 102. In this document, the phrase "instant message" refers to a message that is transmitted from a source to a destination for presentation at the destination at the time it is received by the destination. The instant messages sent to a participant in a conference call may be received and presented through one or more communication devices 102 associated with the participant. For example, the contents of an instant message could be presented to a participant by displaying the contents on a display screen of a communication device 102 or by playing an audio version of the contents through a speaker of the communication device 102.

The instant messages sent to one or more participants in a conference call could contain any information related to the conference call. For example, a conference call is typically associated with a chairperson responsible for managing the conference call. The chairperson may or may not be the first participant to initiate or join a conference call. When the chairperson joins the conference call, the MAS 106 may communicate an instant message to the chairperson identifying the number of participants who have already joined the conference call. The instant message could also identify the names of the participants who have already joined the conference call. In addition, some of the participants who joined a conference call could also leave the conference call before the chairperson joins the call. The instant message sent to the chairperson could identify the number or names of the participants who have joined and left the conference call before the chairperson joined.

As another example, when a new participant joins an existing conference call, an instant message identifying the new participant could be sent to one or more of the other participants already participating in the call. Similarly, when a participant leaves a conference call, an instant message identifying the exiting participant could be sent to one or more of the participants still participating in the call. In this way, one, some, or all of the participants in a conference call can easily identify who joins or leaves a conference call. As particular examples, the instant message identifying a new participant or an exiting participant could be sent only to the chairperson or to all other participants.

As yet another example, before a conference call begins, the MAS 106 may be informed who will be participating in the conference call. The chairperson or any other person could identify the participants who will participate in the call. When the conference call actually starts, such as when the chairperson joins the call, the MAS 106 could send to all of the identified participants an instant message indicating that the conference call has begun. Similarly, when the conference call ends, the MAS 106 could send to the chairperson or to all of the identified participants an instant message indicating that the conference call has ended.

As still other examples, in some embodiments, a conference call may end automatically when a specified amount of time elapses after the chairperson leaves the conference call. In these embodiments, when the chairperson leaves the conference call, the MAS 106 sends an instant message to the other participants indicating that the conference call is ending soon. Also, in some embodiments, a participant may attempt to join a conference call but fail to provide the proper access code. In these embodiments, when a participant provides an improper access code, the MAS 106 sends an instant message to the chairperson identifying the participant, the correct access code, and the incorrect access provided by the participant. The chairperson may then take any suitable action, such as sending an instant message to the participant identifying the correct access code. Further, in some embodiments, a participant in a conference call may transfer the call from one of the participant's communication devices 102 to another communication device 102. When this occurs, the MAS 106 sends an instant message to the chairperson indicating that the participant has transferred devices 102. In addition, in some embodiments, when the conference call ends, the MAS 106 sends to the participants an instant message containing a survey, such as a survey with pre-defined survey questions. The participants may respond with instant messages containing answers to the survey questions, and the MAS 106 tabulates the answers and sends an instant message with the survey results to the chairperson.

This has described several examples of the instant messages that may be communicated to one or more participants before, during, or after a conference call. Instant messages containing other or additional contents could be sent at any suitable time to any or all of the participants without departing from the scope of this disclosure.

In some embodiments, an instant message for a particular participant is sent to a specific communication device 102 associated with that participant. In other embodiments, an instant message for a particular participant is sent to some or all communication devices 102 associated with that participant.

In particular embodiments, such as when the SIP protocol is used in the system 100, a communication device 102 registers with the MAS 106 and is associated with a participant. When an instant message is generated for a participant, the instant message is sent to all registered communication devices 102 for that participant. By communicating the instant message to all registered communication devices 102 for a participant, the participant may be more likely to receive the instant message on at least one device.

Although FIG. 1 illustrates one example of a communication system 100, various changes may be made to FIG. 1. For example, varying communication devices 102, networks 104, and servers 106 could be used in the system 100. Also, the functionality of MAS 106, described above as being implemented on a server, could be implemented on any other computing device, such as a desktop computer or a laptop computer. In addition, FIG. 1 illustrates one operational environment in which the various features of the MAS 106 may be used. These features could be implemented in any other suitable operating environment.

FIG. 2 illustrates an example media application server 106 according to one embodiment of this disclosure. The MAS 106 illustrated in FIG. 2 is for illustration only. Other embodiments of the MAS 106 could be used without departing from the scope of this disclosure. Also, while FIG. 2 illustrates the MAS 106 operating in the system 100 of FIG. 1, the MAS 106 may operate in other suitable systems.

In the illustrated example, the MAS 106 includes a media conductor 202, a media controller 204, two media processors ("MPs") 206a-206b, and a content store 208.

The media conductor 202 processes signaling messages received by the MAS 106. In some embodiments, the communication devices 102 communicate the signaling messages directly (or via a gateway, which serves as an entrance/exit into a communications network) to the MAS 106. In other embodiments, the communication devices 102 communicate signaling messages indirectly to the MAS 106, such as when a Session Initiation Protocol ("SIP") application server 210 (that received a request from a communication device 102) sends the signaling messages to the media conductor 202 on behalf of the communication device 102. The communication devices 102 may communicate directly with the SIP application server 210 or indirectly through a gateway, such as gateway 118. The media conductor 202 processes the signaling messages and communicates the processed messages to the media controller 204. As particular examples, the media conductor 202 may implement SIP call control, parameter encoding, and media event package functionality.

The media controller 204 manages the operation of the MAS 106 to provide services to the communication devices 102. For example, the media controller 204 may receive processed SIP requests from the media conductor 202, where the requests involve conference or other calls. The controller 204 may then select the media processor 206 to handle each of the calls, support audio/video capability negotiations, enforce licenses controlling how the MAS 106 can be used, and control negotiations based on the licenses. The negotiations could include identifying the CODEC or CODECs to be used to encode and decode audio or video information during a call.

The media processors 206a-206b handle the exchange of audio or video information between communication devices 102 involved in a conference or other call. For example, a media processor 206 could receive audio and video information from one communication device 102 involved in a call, process the information as needed, and forward the information to at least one other communication device 102 involved in the call. The audio and video information may be received through one or more ports 212, which couple the media processors 206 to the network 104. The ports 212 may represent any suitable structure operable to facilitate communication between the MAS 106 and the network 104. In some embodiments, each of the media processors 206 represents a software application for specific media processing, such as interactive voice response ("IVR") media or conference media, which is executed on the MAS 106 hardware platform via the operating system.

In this example embodiment, each media processor 206 provides different functionality in the MAS 106. For example, in some embodiments, the media processor 206a provides IVR functionality in the MAS 106. As particular examples, the media processor 206a supports a voice mail function that can record and play messages or an auto-attendant function that provides a menu and directs callers to particular destinations based on their selections. The media processor 206b provides conferencing functionality in the MAS 106, such as by facilitating the exchange of audio and video information between communication devices 102.

The content store 208 provides access to content used by the various components of the system 100. For example, in some embodiments, the content store 208 provides access to stored voice mail messages and access codes used to initiate or join conference calls. The content store 208 also provides access to any other or additional information. In other embodiments, the content store 208 is replaced by a conventional database or other data storage facility.

A Java 2 Enterprise Edition ("J2EE") platform 214 is coupled to the MAS 106. The J2EE platform 214 allows the MAS 106 to retrieve information used to provide subscriber services in the system 100. For example, the J2EE platform 214 may provide audio announcements used by the IVR media processor 206a. The J2EE platform 214 represents one possible apparatus used to provide audio or other information to the MAS 106. Any other or additional device or apparatus may be used to provide the information to the MAS 106.

In a particular embodiment, various components of the MAS 106 represent software processes executed by the processor 112 of the MAS 106. While the components 202-208 have been described as being executed by a MAS 106, the software processes could be executed by other computing devices such as a desktop computer. In other embodiments, the various components of the MAS 106 may be implemented in other ways, such as in hardware.

In the illustrated example, the conference media processor 206b implements the conferencing functionality described above. For example, the media conductor 202 receives signaling messages indicating that two or more communication devices 102 wish to engage in a conference call. The controller 204 receives the requests and causes the conference media processor 206b to establish the conference call. The conference media processor 206b then receives audio or video information from each communication device 102 and forwards the information to the other communication devices 102.

During a conference call, the MAS 106 generates and communicates one or more instant messages to one or more of the participants. In a particular embodiment, the media controller 204 generates the instant messages. The instant messages are then converted into SIP format by the media conductor 202, which communicates the instant messages to one or more communication devices 102. The instant messages may be sent directly to the communication devices 102 by the media conductor 202 or indirectly through the SIP application server 210.

Although FIG. 2 illustrates one example of a media application server 106, various changes may be made to FIG. 2. For example, any number of media processors 206 could be used in the MAS 106. Also, the functional divisions shown in FIG. 2 are for illustration only. Various components can be combined or omitted or additional components can be added according to particular functional designations or needs. In addition, while the components 202-208 have been described as being executed by a server, the components 202-208 may be executed by other hardware platforms, such as a desktop computer or a laptop computer.

Figure 3:
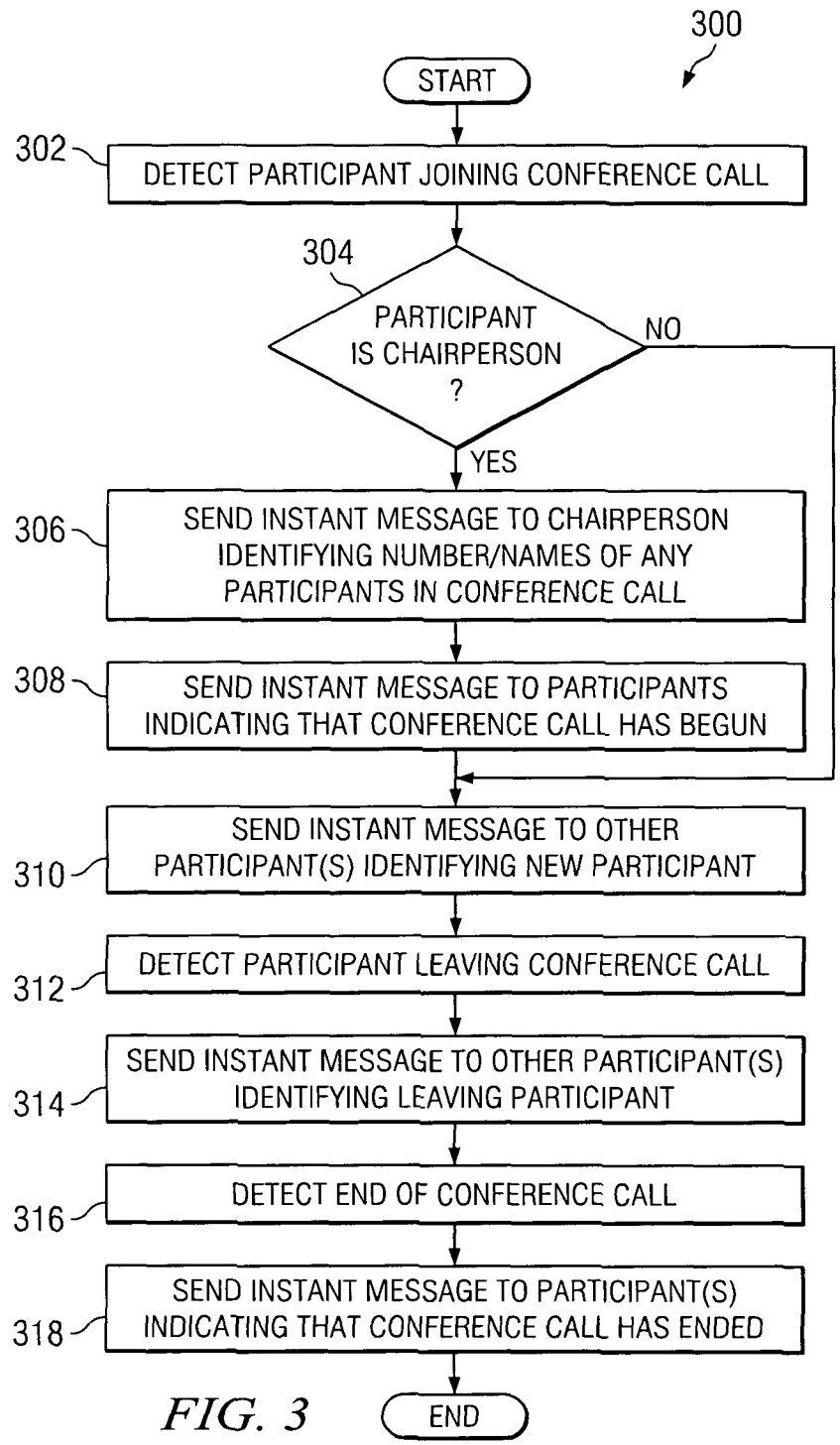
FIG. 3 illustrates an example method for providing instant messages related to a conference call according to one embodiment of this disclosure.

FIG. 3 illustrates an example method 300 for providing instant messages related to a conference call according to one embodiment of this disclosure. For ease of explanation, the method 300 is described with respect to the MAS 106 of FIG. 2 operating in the system 100 of FIG. 1. The method 300 may also be used by other suitable devices or in any other suitable system.

The MAS 106 detects a participant joining or initiating a conference call at step 302. This may include, for example, the media conductor 202 receiving one or more signaling messages, such as SIP messages, from a communication device 102. This may also include the media controller 204 determining that the signaling messages indicate a conference call is desired.

The MAS 106 determines whether the participant joining or initiating the conference call is the chairperson of the call at step 304. This may include, for example, the MAS 106 determining whether, based on registration information provided by the participant's communication device 102, the participant is the chairperson of the conference call. The chairperson may be identified based on any suitable criteria. For example, the participant may enter a code identifying the participant as the chairperson. A participant could also be identified ahead of time as the chairperson of a conference call.

If the participant is the chairperson, the MAS 106 sends the chairperson an instant message identifying the number and names of any other participants who have already joined the conference call at step 306. This may include, for example, the media controller 204 generating the instant message and the media conductor 202 converting the instant message into SIP format. As part of the instant message, the MAS 106 may or may not identify the names and number of participants who joined and then exited the conference call. In various embodiments, the instant message could identify only the number of participants who have joined, only the names of participants who have joined, or both. Other information could also be included, such as the telephone number or location of each participant. The number and names may or may not include the chairperson. By sending this instant message, the chairperson can easily identify the status of the conference (such as who is there and whether everybody has joined) without needing to ask each participant to identify himself or herself.

The MAS 106 also sends an instant message to all participants who should be involved in the conference call indicating that the conference call has started at step 308. This may include, for example, the MAS 106 sending an instant message to each participant in a list of participants for the conference call. This may or may not include the MAS 106 sending the instant message to the chairperson. In this example, the MAS 106 determines that the conference call has "begun" when the chairperson joins the call. In other embodiments, other or additional criteria could be used to determine when a conference call officially begins, such as when a specified number of participants have joined.

Whether or not the new participant is the chairperson, the MAS 106 sends an instant message identifying the new participant to one or more other participants at step 310. This may include, for example, the MAS 106 sending an instant message identifying the new participant to the chairperson only (if the new participant is not the chairperson) or to all other participants who have already joined the conference call. In this way, at least one of the participants already in the conference call can easily identify the new participant.

At some point during the conference call, the MAS 106 detects a participant leaving the conference call at step 312. This may include, for example, the media conductor 202 detecting a signaling message from a communication device 102 terminating a link to the MAS 106. When the MAS 106 detects this event, the MAS 106 sends an instant message to one or more of the other participants identifying the participant who left at step 314. This may include, for example, the MAS 106 sending an instant message identifying the exiting participant to the chairperson only or to all other participants who are still in the conference call. In this way, at least one of the participants in the conference call can easily identify the participant who left.

Eventually, the MAS 106 detects an end to the conference call at step 316. This may include, for example, the MAS 106 determining that the chairperson or all participants have exited the conference call. The MAS 106 then sends an instant message to one or more of the participants indicating that the conference call has ended at step 318. This may include, for example, the MAS 106 sending an instant message to the chairperson only, to all participants who joined the conference call, or to all participants who were expected to participate in the conference call.

Although FIG. 3 illustrates one example of a method 300 for providing instant messages related to a conference call, various changes may be made to FIG. 3. For example, FIG. 3 illustrates the MAS 106 generating instant messages in response to detecting five different events (chairperson joins, conference begins, another participant joins, participant leaves, conference ends). The MAS 106 could send instant messages when other or additional events are detected (conference ending soon, participant provided incorrect pass code, etc.). Also, while steps 306-310, 314, 318 show a single instant message being sent by the MAS 106, the MAS 106 could send multiple instant messages containing the described content during each step. Further, the order of events shown in FIG. 3 is for illustration only. The MAS 106 could detect the events in a different order, such as when a participant leaves the conference call before the chairperson joins. Moreover, an instant message could be sent to one, some, or all of the communication devices 102 associated with a participant who should receive the message. In addition, the MAS 106 may "send" an instant message in different ways depending on the communication device 102 that will receive the message. As a particular example, a text message could be sent to communication devices 102 having a display, while an audio version of the text could be sent to communication devices 102 that lack a display.

It may be advantageous to set forth definitions of certain words and phrases that have been used within this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for call conferencing in an Internet Protocol (IP) communications network, the method comprising:
controlling a conference call with a server within the IP network;
detecting an event associated with the conference call, the conference call associated with a plurality of participants within the IP network,
generating at the server one or more instant message associated with the detected event the one or more instant messages having Session Initiation Protocol (SIP) format; and
communicating the one or more SIP instant messages from the server to one or more of the participants.

2. The method of claim 1, wherein:
the event comprises a chairperson of the conference call joining the conference call; and
the one or more SIP instant messages identify at least one of a number of participants who have joined the conference call and a name of each participant who has joined the conference call.

3. The method of claim 2, wherein the one or more SIP instant messages identify at least one of a number of participants who have joined and exited the conference call and a name of each participant who has joined and exited the conference call.

4. The method of claim 1, wherein:
the event comprises one of the participants at least a one of joining the conference call and exiting the conference call; and
the one or more SIP instant messages identify a name of the participant who has at least a one of joined the conference call and exited the conference call.

5. The method of claim 1, wherein:
the one or more SIP messages are transmitted to the one or more participants via a SIP application server external to the server.

6. The method of claim 1, wherein:
the event comprises one of a beginning and an end of the conference call; and
the one or more SIP instant messages identify that the conference call has one of begun and ended.

7. The method of claim 1, wherein:
the event comprises one of the participants failing to provide a correct pass code when attempting to join the conference call; and
the one or more SIP instant messages are communicated to a chairperson and identify the participant, an incorrect pass code provided by the participant, and the correct pass code.

8. The method of claim 1, wherein:
the event comprises a chairperson of the conference call exiting the conference call; and
the one or more SIP instant messages indicate that the conference call will end after a specified amount of time.

9. The method of claim 1, wherein:
the event comprises one of the participants transferring the conference call from one communication device to another communication device; and
the one or more SIP instant messages indicate that the participant transferred communication devices and is transmitted to the chairperson.

10. The method of claim 1, wherein:
the event comprises an end to the conference call;
the one or more SIP instant messages comprise a survey; and
further comprising:
receiving one or more responses from one or more of the participants containing answers to the survey;
tabulating the answers; and
communicating one or more SIP instant messages containing the tabulated answers to a chairperson of the conference call.

11. An apparatus for call conferencing in an Internet Protocol (IP) communications network, comprising:
one or more ports operable to receive at least one channel of a plurality of channels IP channels for a communication session, the at least one channel having information from at least two of a plurality of conference call participants; and
one or more processors collectively operable to:
detect an event associated with the conference call, the conference call associated with the plurality of participants within the IP network;

generate at the apparatus one or more instant message associated with the detected event, the one or more instant messages having Session Initiation Protocol (SIP) format; and communicate the one or more SIP instant messages to one or more of the participants.

12. The apparatus of claim 11, wherein:

the event comprises a chairperson of the conference call joining the conference call; and the one or more SIP instant messages identify at least one of a number of participants who have joined the conference call and a name of each participant who has joined the conference call.

13. The apparatus of claim 11, wherein:

the event comprises one of the participants at least a one of joining the conference call and exiting the conference call; and the one or more SIP instant messages identify a name of the participant who has at least a one of joined the conference call and exited the conference call.

14. The apparatus of claim 11, wherein:

the one or more SIP messages are transmitted to the one or more participants via a SIP application server external to the server.

15. The apparatus of claim 11, wherein:

the event comprises one of a beginning and an end of the conference call; and the one or more SIP instant messages identify that the conference call has one of begun and ended.

16. The apparatus of claim 11, wherein:

the event comprises one of the participants failing to provide a correct pass code when attempting to join the conference call; and the one or more SIP instant messages are communicated to a chairperson and identify the participant, an incorrect pass code provided by the participant, and the correct pass code.

17. The apparatus of claim 11, wherein:

the event comprises a chairperson of the conference call exiting the conference call; and the one or more SIP instant messages indicate that the conference call will end after a specified amount of time.

18. The apparatus of claim 11, wherein:

the event comprises one of the participants transferring the conference call from one communication device to another communication device; and the one or more SIP instant messages indicate that the participant transferred communication devices and is transmitted to the chairperson.

19. The apparatus of claim 11, wherein:

the event comprises an end to the conference call;

the one or more SIP instant messages comprise a survey; and the one or more processors are further collectively operable to:

receive one or more responses from one or more of the participants containing answers to the survey;

tabulate the answers; and communicate one or more SIP instant messages containing the tabulated answers to a chairperson of the conference call.

20. A media application server in an Internet Protocol (IP) communications network, the media application server comprising one or more processors for executing instructions for:

controlling a conference call within the IP network;

detecting an event associated with a conference call, the conference call associated with a plurality of participants within the IP network; and generating at the server one or more instant message associated with the detected event, the one or more instant messages having Session Initiation Protocol (SIP) format; and communicating one or more instant messages to one or more of the participants.

21. The media application server of claim 20, wherein:

the event comprises a chairperson of the conference call joining the conference call; and the one or more SIP instant messages identify at least one of a number of participants who have joined the conference call and a name of each participant who has joined the conference call.

22. The media application server of claim 20, wherein:

the event comprises one of the participants at least a one of joining the conference call and exiting the conference call; and the one or more SIP instant messages identify a name of the participant who has at least a one of joined the conference call and exited the conference call.

23. The media application server of claim 20, wherein:

the one or more SIP messages are transmitted to the one or more participants via a SIP application server external to the server.

24. The media application server of claim 20, wherein:

the event comprises one of a beginning and an end of the conference call; and the one or more SIP instant messages identify that the conference call has one of begun and ended.

25. The media application server of claim 20, wherein:

the event comprises an end to the conference call;

the one or more SIP instant messages comprise a survey; and further comprising computer readable program code for:

receiving one or more responses from one or more of the participants containing answers to the survey;

tabulating the answers; and communicating one or more SIP instant messages containing the tabulated answers to a chairperson of the conference call.

26. The method of claim 1 wherein the one or more SIP messages are communicated directly from the server to the one or more participants.

27. The method of claim 1 wherein, before a conference call begins the server is informed of the one or more participants in the conference call, when the conference call starts the one or more SIP messages indicating the conference call has begun are communicated to each of the one or more participants.

28. The method of claim 1 wherein each of the one or more participants has associated therewith a plurality of communications devices, and the one or more SIP instant messages are sent to each of the plurality of devices.

29. The apparatus of claim 11 wherein the one or more SIP messages are communicated directly from the apparatus to the one or more participants.

30. The apparatus of claim 11 wherein, before a conference call begins the one or more processors are informed of the one or more participants in the conference call, when the conference call starts the one or more SIP messages indicating the conference call has begun are communicated to each of the one or more participants.

31. The media application server of claim 20 wherein the one or more SIP messages are communicated directly from the apparatus to the one or more participants.

32. The media application server of claim 20 wherein, before a conference call begins the media application server is informed of the one or more participants in the conference call, when the conference call starts the one or more SIP messages indicating the conference call has begun are communicated to each of the one or more participants.

* * * * *